United States Patent Office 3,096,217
Patented July 2, 1963

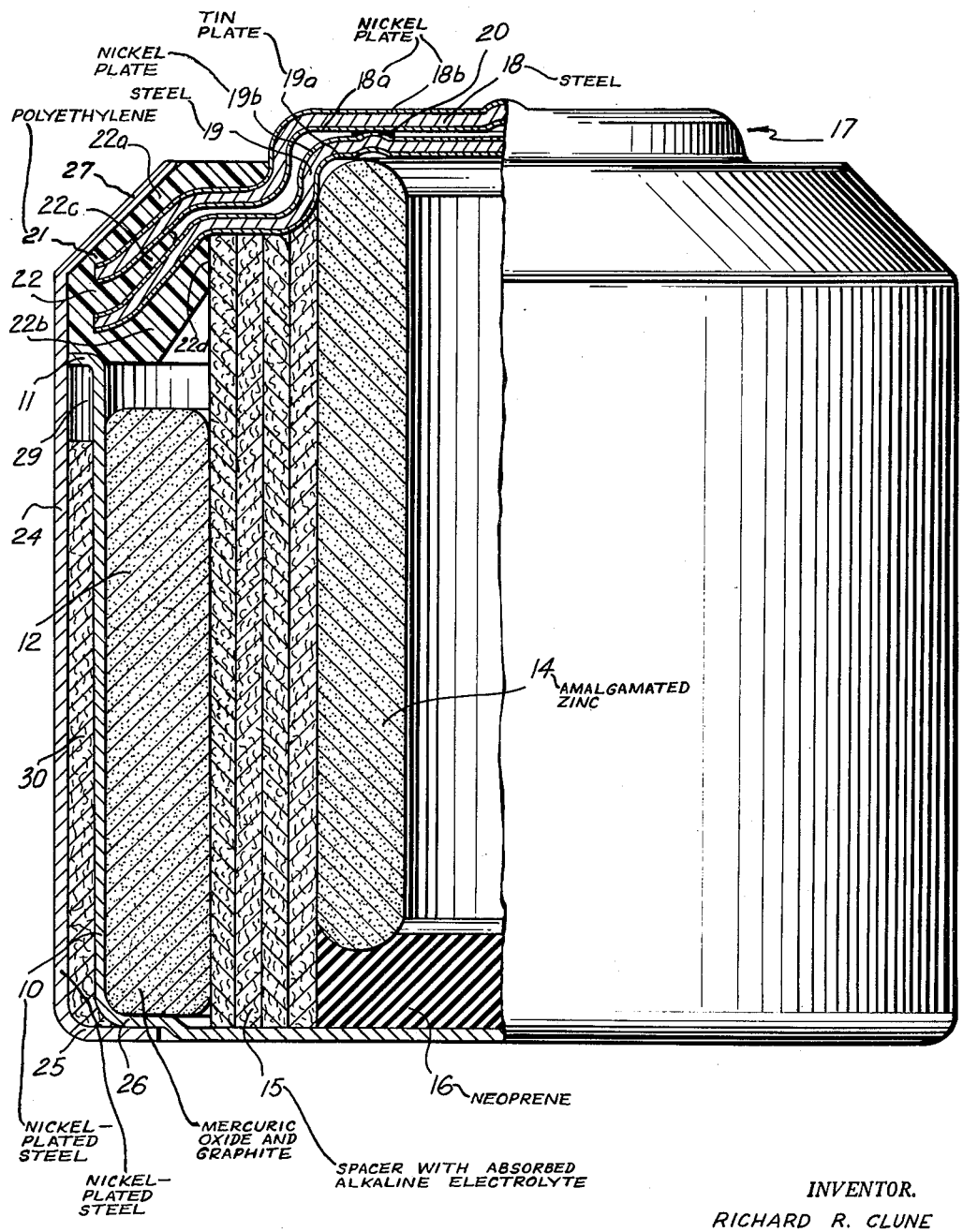

3,096,217
LEAK-PROOF ELECTROCHEMICAL CELL
Richard R. Clune, Ardsley, N.Y., assignor to P. R. Mallory & Co., Inc., Indianapolis, Ind., a corporation of Delaware
Filed Oct. 4, 1960, Ser. No. 60,344
7 Claims. (Cl. 136—107)

This invention relates to electrochemical cells, and, more particularly, to an alkaline dry cell of novel and improved character.

Alkaline dry cells of the type disclosed in Ruben patent 2,422,045 generally comprise a pair of terminals in the form of metal cups or shells which together with an insulating sealing collar compressed between cooperating marginal portions thereof constitute a sealed enclosure for the cell. One of these cups or shells is in electrical contact with a suitable cathode depolarizer, such as a mixture of mercuric oxide and graphite, whereas the other one of said cups or shells is in contact with the anode, which is preferably of amalgamated zinc. An immobilized body of an alkaline electrolyte, such as potassium hydroxide containing a substantial amount of zincate, is interposed between the cathode and the anode. In the preferred form of the Ruben cell, one of the terminals was in the form of a cylindrical can and the other was a top closure member in the form of a dish metal plate, formed of zinc, or of a metal having a low electrochemical potential with respect to zinc, such as copper, brass, or tin-plated steel.

In cells of the described character considerable difficulties were experienced with electrolyte creepage. Even though the compressed insulating sealing collar provided a generally air-tight seal for the cell, a small amount of electrolyte would frequently creep along the inner surface of the top closure disc and progressing around the edge of said disc would arrive to the top surface thereof. When even a small quantity of the alkaline electrolyte would be present on the top surface of the closure disc and become exposed to the atmosphere, such electrolyte would react with the carbon dioxide in the air and would cause the formation of incrustations. Such incrustations, in addition to causing corrosion, would constitute an insulating film on the top closure disc which would increase the contact resistance between said disc and the contact spring by means of which the cell was connected to an external circuit. While the incrustations could be readily removed, for example by washing the cell with a dilute solution of ammonium hydroxide, it was a frequent source of operating difficulties.

Considerable progress toward solution of the outstanding problem has been made by introduction of the so-called "double-top" construction disclosed and claimed in Williams Patent 2,712,565. In this form of construction, the top closure member combined with the usual metal casing or inner can comprised a pair of metal plates or discs, the center portions of which were interfitting or were nested in each other while their edges were slightly separated. The marginal portion of the inner can and of the top closure discs had an insulating sealing member or collar of elastic material interposed therebetween, with a portion of said sealing collar extending around the edges of the discs and being continued for a short distance. An outer can or jacket encircled the inner can and was constricted at one end directly above the sealing collar to apply sealing pressure thereon, thereby defining a substantially air-tight enclosure for the cell. In the assembled position, an intermediate portion of the sealing collar was forced to extend into the interspace between the edges of the two top discs and thereby further improved the air-tight character of the seal. For best results, the inner top disc was formed of or was at least plated on both faces thereof with a metal having a low potential with respect to the anode, such as tin for a zinc anode, whereas the outer top disc was composed of or was at least plated on both faces thereof with a metal having good corrosion resistance to the electrolyte, such as nickel.

While the "double-top" structure represented a substantial improvement over prior cell constructions and was successfully used in the quantity production of alkaline dry cells, incrustations would still frequently appear on the outer top disc, particularly after prolonged storage. These incrustations not only interfered with the operation of the cell in presenting excessive contact resistance between the cell top and the corresponding contact spring but also presented an unsightly appearance, creating the erroneous impression in the user that the cell was already partially or completely discharged. Thus, the unexplained and uncontrollable gradual appearance of incrustations, indicating that electrolyte creepage was not completely eliminated, presented a serious problem for which no satisfactory solution was known.

I have discovered that the outstanding problem may be solved in a remarkably simple manner.

It is an object of the present invention to provide an electro-chemical cell, specifically an alkaline dry cell, of novel and improved character which is completely free from the detrimental effects of electrolyte creepage.

It is a further object of the present invention to provide an alkaline primary dry cell which is free from electrolyte leakage even under conditions when excessive internal pressures are developed therein or are released therefrom.

The invention also contemplates an alkaline dry cell, the terminals of which remain clean and free from corrosion or incrustations at all times and which may be readily manufactured on a practical and industrial scale at a low cost.

Other and further objects and advantages of the present invention will become apparent from the following description, taken in conjunction with the accompanying drawing which is a vertical sectional view, having parts in elevation, of an electrochemical cell embodying the invention.

The single FIGURE of the drawing illustrates a cell in accordance with the invention which is shown in elevation and partly in section.

Broadly stated, I have discovered that the heretofore uncontrollable corrosion and formation of incrustations experienced with conventional "double-top" cell structures was due to the interaction of minute amounts of electrolyte, trapped in the interspace between the two top discs, with the dissimilar metals present in such interspace. In the usual form of the "double-top" cell, the inner top disc is formed of or is at least plated with a metal having low potential with respect to the zinc anode, a steel disc plated with tin on both of its faces being commonly used. The outer top disc, on the other hand, is composed of, or is at least plated with, a metal having good corrosion resistance to the alkaline electrolyte, a steel disc plated with nickel on both of its faces being used in most cases. Thus, two dissimilar metals, tin and nickel, are present in the two faces defining the interspace between the top discs. I have further found that even though the compressed insulating sealing collar provided a generally air-tight seal for the cell, a small amount of electrolyte would frequently creep around the edge of the inner top disc and arrive to the interspace defined between the outer surface of the inner top disc and the inner surface of the outer top disc; or electrolyte is trapped in the same interspace between the inner and outer top discs during the closing operation at the time of manufacture. When this electrolyte is present between the outer (tin) surface of the inner top disc and the inner (nickel) surface of the outer top disc, a galvanic couple is formed between the two dissimilar metals. As the couple is effectively short-circuited by the contacting center portions of the top discs, gas is evolved by partial electrolytic decomposition of the electrolyte that is between the top discs, forcing the remainder of such electrolyte past the closure of the outer top disc to the outer surface of the said disc. This alkaline electrolyte will react with the carbon dioxide in the atmospheric air forming alkali metal carbonates in the form of incrustations. As is known, these incrustations, in addition to their unsightly appearance, cause corrosion, poor contact and other operating difficulties.

In accordance with the principles of the invention, these difficulties are completely eliminated by plating the inner surface of the inner metal top disc with a metal having low potential with respect to the anode, such as with tin, and by plating the outer surface of said inner top disc with the same metal that is plated on both surfaces of the outer top disc and having good corrosion resistance to the electrolyte, such as nickel. As the dissimilar metals formerly present in the interspace between the two top discs, tin and nickel, have thus been replaced with the same metal, nickel, no galvanic couple is formed. Thus, no gas generation can take place in the interspace, thereby eliminating the cause underlying the formation of incrustations.

In accordance with the invention, further important advantages are obtained by molding, preferably injection molding, an insulating and sealing collar of a suitable elastomer, such as high-density polyethylene, around the novel combination of top discs comprising an outer steel disc nickel-plated on both of its surfaces and a bi-plated (nickel on the outside—tin on the inside) steel inner disc. Preferably, the molded collar is so shaped that it extends for a substantial radial distance and in intimate contact with both surfaces of the inner and outer discs.

In contrast to the prefabricated sealing collar of the conventional "double-top" structure, the integrally molded insulating and sealing collar of the present invention will to a substantial extent fill out the interspace between the two top discs with the molding compound and, since this space is filled, no electrolyte can be trapped therein during the closing operation at the time of manufacture. Therefore, the entire sealing region is dry at the time of sealing. Moreover, the novel combination of the "double-top" structure with the sealing collar integrally molded around the top discs also greatly increases the length of any creepage path from the inner surface of the inner disc to the outer surface of the outer discs. Tests carried out on a large scale have proven that the principles of the present invention assure complete freedom from corrosion and incrustation difficulties and provide complete, inexpensive and practical solution for a vexatious problem of long standing.

Referring now more particularly to the drawing, reference numeral 10 denotes an inner casing or can of nickel-plated steel having a cylindrical shape and an outwardly extending flange 11 at its open end. A suitable cathode depolarizer 12, such as a mixture of mercuric oxide with a small proportion of graphite, is provided in the form of a cylindrical sleeve which is in pressure fit and electrical contact wth the inner surface of can 10. An anode 14 in the form of a cylindrical sleeve pressed from amalgamated zinc powder is also provided in can 10 and is concentrically spaced from cathode 12. A plurality of layers 15 of absorbent spacer material, such as an alkali-resistant paper, are interposed between cathode 12 and anode 14. These spacer layers are saturated with an electrolyte which is preferably constituted of an alkali metal hydroxide also containing a suitable amount of dissolved zinc. An insulative spacer 16 of inert elastic material, such as a synthetic elastomer known as Neoprene, is provided at the bottom of can 10 and serves to prevent direct electrical contact between the anode and the can.

The top closure member of the cell is generally denoted by reference numeral 17 and comprises a pair of dished metal plates 18 and 19. It will be noted that these dished plates or discs are so formed as to have their center portions nested in each other and their outer edges slightly separated from each other so that they encompass an acute angle therebetween. Inner top disc 19 is plated with a layer of tin 19a on the inner surface thereof and with a layer of nickel 19b on the outer surface thereof whereas outer top disc 18 is plated with layers of nickel 18a and 18b both on its inner and outer surfaces thereof, respectively. In actual practice, this may be readily accomplished by stamping outer disc 18 from steel sheet plated with nickel on both of its faces and by stamping inner disc 19 from bi-plated steel, in other words, steel sheet plated with tin on one of its faces and with nickel on the other of its faces. The center portions of the two top discs are electrically and mechanically connected to each other, such as by resistance welding at dimples 20 of which preferably three are provided on the inner disc. Equal or similar results may be obtained by force-fitting the center portions of the top discs, although resistance welding is preferred in that it positively assures permanent low-resistance electrical connection of the discs.

An insulating and sealing collar 21 of high-density polyethylene is integrally molded around the edges of top disc 18 and 19 for insulating the top discs from the inner can and also to constitute an air-tight enclosure therewith. Sealing collar 21 comprises a body portion 22 from which extend an outer sleeve portion 22a along the outer surface of outer disc 18, an inner sleeve portion 22b along the inner surface of inner disc 19, and an intermediate sleeve portion 22c into the interspace between the discs. As it will be observed in the drawing, all three sleeve portions extend for a substantial radial distance along and in intimate contacting or adhering relation with repect to the corresponding metal surfaces. Face 22d of sleeve portion 22b is so oriented and dimensioned as to constitute a locating ring for the absorbent spacer material 15.

An outer cam or jacket 24 of nickel-plated steel encircles the inner can 10, including the marginal regions of top discs 18 and 19. At one end, the edge of the outer can or jacket is bent inwardly, as indicated at 25, and rests on an annular ledge 26 of the inner can. At the other end, the said jacket is crimped inwardly as indicated at 27. It will be noted that the jacket will apply axial compression on body portion 22 of sealing collar 21 and at the same time will apply compression in a generally radial direction upon outer sleeve portion 22a. It has been found that a structure of this type provides an excellent and positively air-tight closure for the cell.

From the foregoing description, the operation of the cell of the invention will be readily understood by those skilled in the art. It is to be observed at the outset that under normal conditions the cell is air-tightly sealed and the leakage of any electrolyte therefrom is positively prevented. This is due to the particular construction of the molded insulating sealing collar and to its cooperation with the marginal portions of the inner and outer cans and of the top closure discs. Thus, the body portion and the outer sleeve portion of the sealing collar are strongly compressed in different directions and in two regions separated from each other, such sealing effect being further improved by having intermediate portion 22c of the collar extending for a substantial radial distance into the interspace between the discs.

It is further to be noted that the cell is completely free from the detrimental effects of electrolyte creepage. Even though the alkaline electrolytes used have a strong tendency for creeping along any metal surface with which they are in contact, such electrolyte creepage will be minimized by the extremely long leakage paths provided by the particular construction of the molded sealing collar and as a result of the intimate contact between the said collar and the metal surfaces of the top discs. Should, however, any minute quantity of electrolyte creep along the inner surface of the inner top disc and, traveling around the edge of said disc, arrive into the interspace between the discs, it will be trapped in said interspace and will never arrive to the exterior of the cell. Due to the fact that the interspace is defined by identical metal surfaces, in the instant case of nickel, no galvanic couple will be formed and no gas generation will occur. Therefore, the exposed surface 18b of outer top disc 18 will always remain clean and free from incrustations and corrosion even after prolonged periods of storage.

Moreover, the cell structure of the invention is self-venting, in that it is capable of releasing any excessive internal pressure that may result from abnormal operating conditions. Any excessive increase in the internal pressure will cause slight displacement of the inner can 10 and of the top closure member 17 from each other which in turn increases the pressure on sleeve portion 22a of the sealing collar. As a result, the gas may pass underneath body portion 22 of the sealing collar and around flange 11 of inner can 10 into the interspace 29 between inner can 10 and outer can or jacket 24. From this interspace, the gas pressure is harmlessly released between ledge 26 of the inner can and inwardly turned edge 25 of the outer can. In order to prevent that the vented gas take and of the electrolyte with it, it is desirable to provide a body of porous material, such as a sleeve 30 of porous paper, in the interspace between inner can 10 and outer can 24. Any electrolyte reaching said sleeve will be absorbed thereby so that it will never arrive to the exterior of the cell. For further details of the self-venting construction and its operation, reference may be made to Colton Patent 2,636,062 in which this particular feature is more fully disclosed and claimed.

Although the present invention has been disclosed as specifically applicable to alkaline primary dry cells, it may be applied with equal or similar results to other electrochemical devices, such as electrolytic condensers, electrolytic rectifiers, secondary cells, and the like. Also, the usefulness of the present invention is not limited in any way to alkaline dry cells, but is capable of producing excellent results in all types of primary cells employing a great variety of electrochemical cell systems. It is further to be noted that the double top disc-molded sealing collar structure of the invention is applicable to cells in which the self-venting construction is dispensed with. In that case, the lower portion of the outer container or can 24, starting from flange 11 of inner can 10 downwards, is omitted and upper portion 27 of the said outer can is formed integrally with the inner can 10. This results in an electrode can or terminal closely similar in shape to that shown, for example, in Ruben Patent 2,576,266. Of course, in a cell of this type there is no particular necessity for providing ledge 26 on the inner can which may be formed with a flat bottom face. All of these variations and modifications are considered to be within the true spirit and scope of the present invention, as disclosed in the foregoing description and defined by the appended claims.

I claim:
1. An electrical current producing cell comprising, in combination, a metal casing, a top closure member therefor comprising an inner and an outer metal top disc having interfitting center regions and their edges separated, an insulating sealing collar compressed between marginal portions of said casing and of said discs, a cathode in said casing and in electrical contact therewith, an anode spaced from said cathode and in electrical contact with the inner surface of the inner top disc, and an electrolyte interposed between said cathode and said anode, the inner surface of the inner top disc being formed of a first metal having low electrochemical potential with respect to the anode metal, and the outer surface of the inner top disc and both surfaces of the outer top disc being formed of a second metal inert to the electrolyte whereby the outer surface of the inner top disc and the inner surface of the outer top disc are inert and equipotential with respect to the electrolyte.

2. An alkaline dry cell comprising, in combination, a metal casing, a top closure member therefor comprising inner and outer metal top discs having interfitting electrically and mechanically connected center regions and their edges spaced from each other, an insulating sealing collar compressed between marginal portions of said casing and of said discs and also extending into the interspace of said discs, a cathode depolarizer in said casing and in electrical contact therewith, a zinc anode spaced from said cathode and in electrical contact with the inner surface of the inner top disc, and an alkaline electrolyte interposed between said cathode and said anode, the inner surface of the inner top disc being formed of a first metal having low electrochemical potential with respect to zinc, the outer surface of the inner top disc and both surfaces of the outer top disc being formed of a second metal having good corrosion resistance to the electrolyte, the outer surface of the inner top disc and the inner surface of the outer top disc being formed of the same metal.

3. An alkaline dry cell comprising, in combination, a metal casing, a top closure member therefor comprising an inner and an outer steel top disc having interfitting contacting center regions and their edges spaced from each other, an insulating sealing collar compressed between marginal portions of said casing and of said discs and also extending into the interspace of said discs, a cathode depolarizer in said casing and in electrical contact therewith, an amalgamated zinc anode spaced from said cathode and in electrical contact with the inner surface of the inner top disc, and an electrolyte of an alkali metal hydroxide interposed between said cathode and said anode, the inner surface of said inner top disc being tin-plated and the outer surface of said inner top disc and both surfaces of the outer top disc being nickel-plated.

4. An electrical current producing cell comprising, in combination, a metal casing, a top closure member therefor comprising inner and outer metal top discs having interfitting electrically and mechanically connected center regions and their edges spaced from each other, a sealing member of elastic insulating material integrally molded around the circumferential edges of said discs in intimate contacting relation with substantial inner and outer surface portions of both discs and also extending into the interspace therebetween for a distance which constitutes an appreciable portion of the radius of the discs, said member being compressed between cooperating marginal portions of said casing and of said discs, a cathode in said casing and in electrical contact therewith, an anode spaced from said cathode and in electrical contact with the inner surface of the inner top disc, and an electrolyte interposed between said cathode and said anode, the inner surface of the inner top disc being formed of a first metal having low electrochemical potential with respect to the anode metal, and the outer surface of the inner top disc and both surfaces of the outer top disc being formed of a second metal corrosion-resistant with respect to the electrolyte whereby the outer surface of the inner top disc and the inner surface of the outer top disc are both formed of said second metal.

5. An alkaline dry cell comprising, in combination, a metal casing, a top closure member therefor comprising inner and outer metal top discs having interfitting connected center regions and their edges spaced from each other, a sealing member of elastic insulating material integrally molded around the circumferential edges of said discs in intimate contacting relation with substantial inner and outer surface portions of both discs and also extending into the interspace therebetween for a distance which constitutes an appreciable portion of the radius of the discs, said member being under sealing compression between cooperating marginal portions of said casing and of said discs, a cathode depolarizer in said casing and in electrical contact therewith, a zinc anode spaced from said cathode and in electrical contact with the inner surface of the inner top disc, and an alkaline electrolyte interposed between said cathode and said anode, the inner surface of the inner top disc being formed of a first metal having low electrochemical potential with respect to zinc, and the outer surface of said inner top disc and both surfaces of the outer top disc being formed of a second metal having good corrosion resistance with respect to the electrolyte.

6. A self-venting electrical current producing cell comprising, in combination, a cup-shaped cathode terminal, an anode terminal comprising inner and outer dished discs nested in each other with their edges separated, said terminals having cooperating marginal portions, an insulative sealing collar integrally molded around the edges of said discs having a body portion extending between said cooperating marginal portions of the terminals and also having a sleeve portion extending along the outer surface of the outer disc, an annular jacket encircling said marginal portions of the terminals and crimped over said sleeve portion of the sealing collar thereby maintaining both portions thereof under compression, a cathode in contact with said cup-shaped terminal, an anode in contact with the inner surface of said inner disc, and a body of electrolyte interposed between said cathode and anode, the inner surface of the inner disc being formed of a first metal having low electrochemical potential with respect to the anode metal, the outer surface of the inner disc and both surfaces of the outer disc being formed of a second metal having high corrosion resistance to the electrolyte whereby the outer surface of the inner disc and the inner surface of the outer disc are substantially equipotential with respect to the electrolyte.

7. A self-venting alkaline dry cell comprising, in combination, an inner can, a top closure member therefor comprising inner and outer dished discs nested in each other with their edges separated, an insulative sealing collar integrally molded around said discs having a body portion extending between marginal portions of said can and of said closure member and also having a sleeve portion extending along the outer surface of the outer disc, an outer can encircling said inner can and having its mouth portions crimped over the sleeve portion of the sealing collar thereby maintaining said collar under compression, a cathode in contact with said inner can, a zinc anode in contact with the inner surface of the inner disc, and an alkaline electrolyte interposed between said cathode and said anode, said outer disc being formed of nickel-plated steel and said inner disc being formed of steel, the inner surface of which is tin-plated and the outer surface of which is nickel-plated.

References Cited in the file of this patent

UNITED STATES PATENTS

| | | |
|---|---|---|
| 291,286 | Brewer | Jan. 1, 1884 |
| 2,650,945 | Herbert | Sept. 1, 1953 |
| 2,712,565 | Williams | July 5, 1955 |